United States Patent
Hwangbo et al.

(10) Patent No.: US 9,218,763 B2
(45) Date of Patent: Dec. 22, 2015

(54) DISPLAY DEVICE HAVING DISPLAY PANEL WITH INTEGRATED LOGO

(71) Applicant: LG ELECTRONICS INC., Seoul (KR)

(72) Inventors: Deung Hwangbo, Seoul (KR); Junki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 13/899,308

(22) Filed: May 21, 2013

(65) Prior Publication Data

US 2014/0218412 A1    Aug. 7, 2014

(30) Foreign Application Priority Data

Feb. 7, 2013 (KR) .................. 10-2013-0014051

(51) Int. Cl.
- *G09G 3/32* (2006.01)
- *G06F 1/16* (2006.01)
- *G09F 13/00* (2006.01)
- *G09F 13/06* (2006.01)

(52) U.S. Cl.
CPC ............ *G09G 3/3208* (2013.01); *G06F 1/1601* (2013.01); *G09F 13/005* (2013.01); *G09F 13/06* (2013.01)

(58) Field of Classification Search
CPC .............. G02F 1/133308; G02F 2001/133354; G02F 2001/133311; G02F 2001/133314; G02F 2001/13332; G02F 2001/133322; G02F 2001/133325; G02F 2001/133374; G02F 2201/46; G02F 2201/465; G02F 2201/48; G02F 2201/50; G09G 3/3406; H05K 1/189

See application file for complete search history.

(56) References Cited

U.S. PATENT DOCUMENTS

| | | | | |
|---|---|---|---|---|
| 5,986,736 | A * | 11/1999 | Kodera et al. | 349/134 |
| 7,298,076 | B2 * | 11/2007 | Ozolins et al. | 313/479 |
| 7,440,264 | B2 * | 10/2008 | Lam et al. | 361/679.27 |
| 7,803,016 | B2 * | 9/2010 | Neu et al. | 439/569 |
| 8,033,695 | B2 * | 10/2011 | Kerr et al. | 362/364 |
| 2010/0025083 | A1 * | 2/2010 | Yang | 174/254 |
| 2011/0025971 | A1 * | 2/2011 | Fujikawa | 349/149 |
| 2011/0241553 | A1 * | 10/2011 | Schindler | 315/158 |
| 2012/0098736 | A1 * | 4/2012 | Yee | 345/76 |
| 2012/0182722 | A1 * | 7/2012 | Wu | 362/157 |
| 2012/0320278 | A1 * | 12/2012 | Yoshitani et al. | 348/725 |
| 2013/0063050 | A1 * | 3/2013 | Morikawa et al. | 315/316 |
| 2014/0063049 | A1 * | 3/2014 | Armstrong-Muntner | 345/619 |

* cited by examiner

*Primary Examiner* — Nalini Mummalaneni

(74) *Attorney, Agent, or Firm* — Birch, Stewart, Kolasch & Birch, LLP

(57) ABSTRACT

A display device including a display panel having an image display area and a non-display area, a driver circuit unit to feed an image formation driving signal to the display panel and a controller is provided. The display panel includes a transparent board including a light shielding portion formed along an edge thereof to define the non-display area and a light transmitting portion formed at a part of the light shielding portion, a rear board placed to face the transparent board and a logo module placed on a rear surface of the transparent board to overlap the light transmitting portion to outwardly display a logo through the light transmitting portion. At least a part of the driver circuit unit is formed on one of the transparent board and the rear board so as to overlap the light shielding portion. The display device may minimize a lower bezel region.

13 Claims, 11 Drawing Sheets

DISPLAY DEVICE HAVING DISPLAY PANEL WITH INTEGRATED LOGO

Pursuant to 35 U.S.C. 119(a), this application claims the benefit of earlier filing data and right of priority to Korean Patent Application No. 10-2013-0014051, filed on, Feb. 7, 2013, the contents of which are hereby incorporated by reference herein in their entirety.

BACKGROUND OF THE INVENTION

1. Field of the Invention

The present invention relates to a display device, which minimizes the thickness of a bezel portion using a display panel with an integrated logo.

2. Discussion of the Related Art

A display device refers to a device that displays an input image signal. The concept of a display device includes a monitor that displays an image received from a computer, a television that displays an image and sound transmitted from a broadcasting station, and all other devices that display an image input from the outside.

In recent years, a Liquid Crystal Display (LCD) panel, an Organic Light Emitting Diode (OLED) panel, and so on are a focus of attention as a flat panel type display module to realize a high-resolution large display device. In general, a display device includes a display panel to form an image, a Printed Circuit Board (PCB) to control the image of the display panel and control sound and communication, a front bezel frame to surround a front rim of the display panel, and a rear cover to cover the rear side of the display panel.

In such a display device, design factors and user convenience have recently been emphasized to improve aesthetics as well as a basic image display function according to the trend of a greater size, slimness and higher quality. In one example, efforts to develop a borderless display device have continued, in which the entire display device is reminiscent of a single large and black glass panel or frame owing to elimination of a boundary between a screen (display area) and a bezel portion (non-display area) by omitting the front bezel frame of the display device.

Meanwhile, manufacturers of display devices tend to mount their logo on a front surface of a display device, in order to improve display device brand recognition. The logo must have a predetermined size or more to achieve visual differentiation.

Conventionally, to install the aforementioned logo, it is essential that the display device be provided at more than one end thereof with the front bezel frame. As a result, the aforementioned borderless display device still faces technical challenges.

SUMMARY OF THE INVENTION

Accordingly, the present invention is directed to a display device having a display panel with an integrated logo that substantially obviates one or more problems due to limitations and disadvantages of the related art.

An object of the present invention is to provide a display device, which is capable of displaying a logo on a front surface thereof even while minimizing a bezel portion through omission of a front bezel frame that has conventionally been required to install a logo.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a display panel including an image display area for formation of an image and a non-display area formed around the image display area, a driver circuit unit configured to feed a driving signal for formation of the image to the display panel, and a controller configured to control the display panel and the driver circuit unit, wherein the display panel includes a transparent board including a light shielding portion formed along an edge thereof to define the non-display area by blocking light, and a light transmitting portion formed by removing a part of the light shielding portion, a rear board placed to face the transparent board, and a logo module placed on a rear surface of the transparent board so as to overlap the light transmitting portion, the logo module outwardly displaying a logo through the light transmitting portion, and wherein at least a part of the driver circuit unit is formed on the transparent board or the rear board so as to overlap the light shielding portion.

The logo module may include a light-transmitting diffusion sheet placed at the rear side of the light transmitting portion, a semi-transparent reflective sheet placed at the rear side of the diffusion sheet, and a light source placed at the rear side of the reflective sheet, to introduce light into the reflective sheet.

Colored light-transmitting ink may be applied to the light transmitting portion.

The display panel may further include an Organic Light Emitting Diode (OLED) layer provided in the image display area between the transparent board and the rear board, the OLED layer serving to emit light, the rear board may be bonded to the transparent board so as to seal the OLED layer to the transparent board, the rear board may be an encapsulation board having an inwardly indented recess corresponding to the light transmitting portion, and the logo module may be located in the recess.

The display panel may further include a sealing portion to seal a space between the transparent board and the rear board, and a liquid crystal layer placed inside the sealing portion in the space between the transparent board and the rear board, and the light transmitting portion of the transparent board and the logo module may be arranged at the outside of the sealing portion.

The display panel may further include a light-leakage prevention structure configured to surround at least a part of the periphery of the logo module and serving to block light emitted from the logo module for display of the logo.

The driver circuit unit may include a driver Integrated Chip (IC) formed on the transparent board or the rear board so as to overlap the light shielding portion and serving to generate the driving signal as an electric signal, and a conductive line diagonally extending from the driver IC to transmit the electric signal.

The display device may further include a printed circuit board provided with the controller, and a flexible board having one end connected to the printed circuit board and the other end connected to the driver circuit unit so as to electrically connect the printed circuit board and the driver circuit unit to each other.

The flexible board may be a Tape Carrier Package (TCP) or a Flexible Printed Circuit Board (FPCB).

The printed circuit board may be placed on a rear surface of the rear board.

The driver circuit unit may include a driver IC to generate the driving signal as an electric signal and a conductive line to transmit the electric signal, the driver IC may be mounted on the flexible board. The conductive line may be formed on the transparent board or the rear board so as to overlap the light shielding portion.

The controller may control the logo module to display the logo having a first brightness and a first color when power is not applied to the display panel.

The controller may control the logo module to display the logo such that the logo having a second brightness different from the first brightness flickers preset times, or such that the logo having a second color different from the first color flickers preset times, upon change to apply power to the display panel for display of the image.

The controller may control the logo module to display the logo such that a light source of the logo module is turned off, such that the logo having a third brightness different from the first brightness is displayed, or such that the logo having a third color different from the first color is displayed, while the display panel displays the image.

The controller may control the logo module to display the logo such that a light source of the logo module is turned off, such that the logo having a fourth brightness different from the first brightness is displayed, or such that the logo having a fourth color different from the first color is displayed, when a control signal is input from an external controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, exemplary embodiments of the present invention will be described in detail with reference to the accompanying drawings. The terms or words used in the specification and claims of the present invention are not interpreted using typical or dictionary limited meanings, and are constructed as meanings and concepts conforming to the technical sprit of the present invention based on the principle that the inventors can appropriately define the concepts of the terms to explain the present invention in the best manner.

Accordingly, it is to be understood that the detailed description, which will be disclosed along with the accompanying drawings, is intended to describe the exemplary embodiments of the present invention and is not intended to represent all technical ideas of the present invention. Therefore, it should be understood that various equivalents and modifications can exist which can replace the embodiments described in the time of the application.

The terms used in the present invention may be interpreted based on the following references, and even terms not described in the present invention may be interpreted based on the following references. Coding may be interpreted as encoding or decoding as occasion demands, and information is the term including all of values, parameters, coefficients, elements, and the like and may be interpreted differently as occasion demands, and therefore the present invention is not limited thereto. With respect to constituent elements used in the following description, suffixes "module" and "unit" are given or mingled with each other only in consideration of ease in the preparation of the specification, and do not have or serve as different meanings. 'Unit' is used to refer to a basic unit of image processing or a particular position of an image, and may be used along with terms, such as 'block', 'partition', 'region', or the like as occasion demands.

Hereinafter, a display device according to several embodiments of the present invention will be described with reference to FIGS. 1 to 9.

Figure 1:
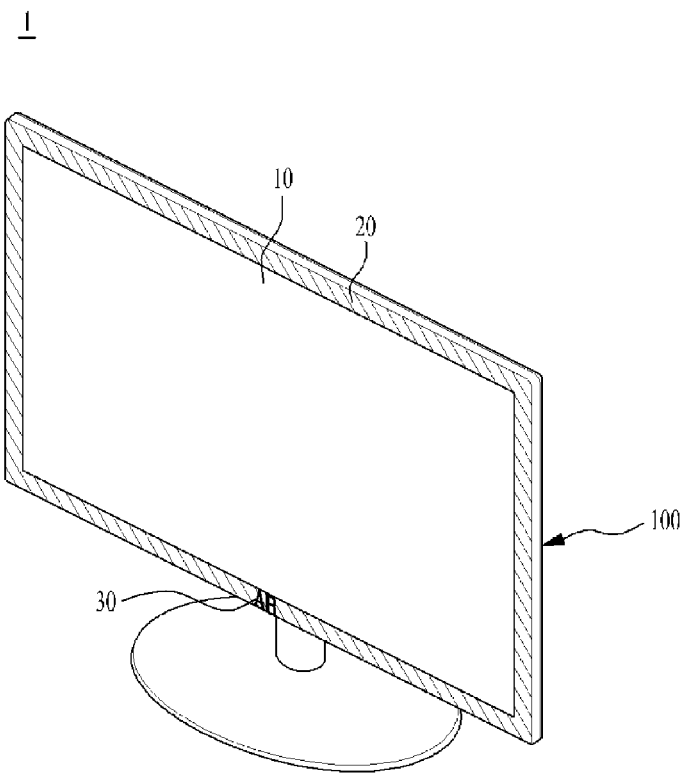
FIG. 1 is a front perspective view illustrating a display device according to an embodiment of the present invention.
Figure 2:
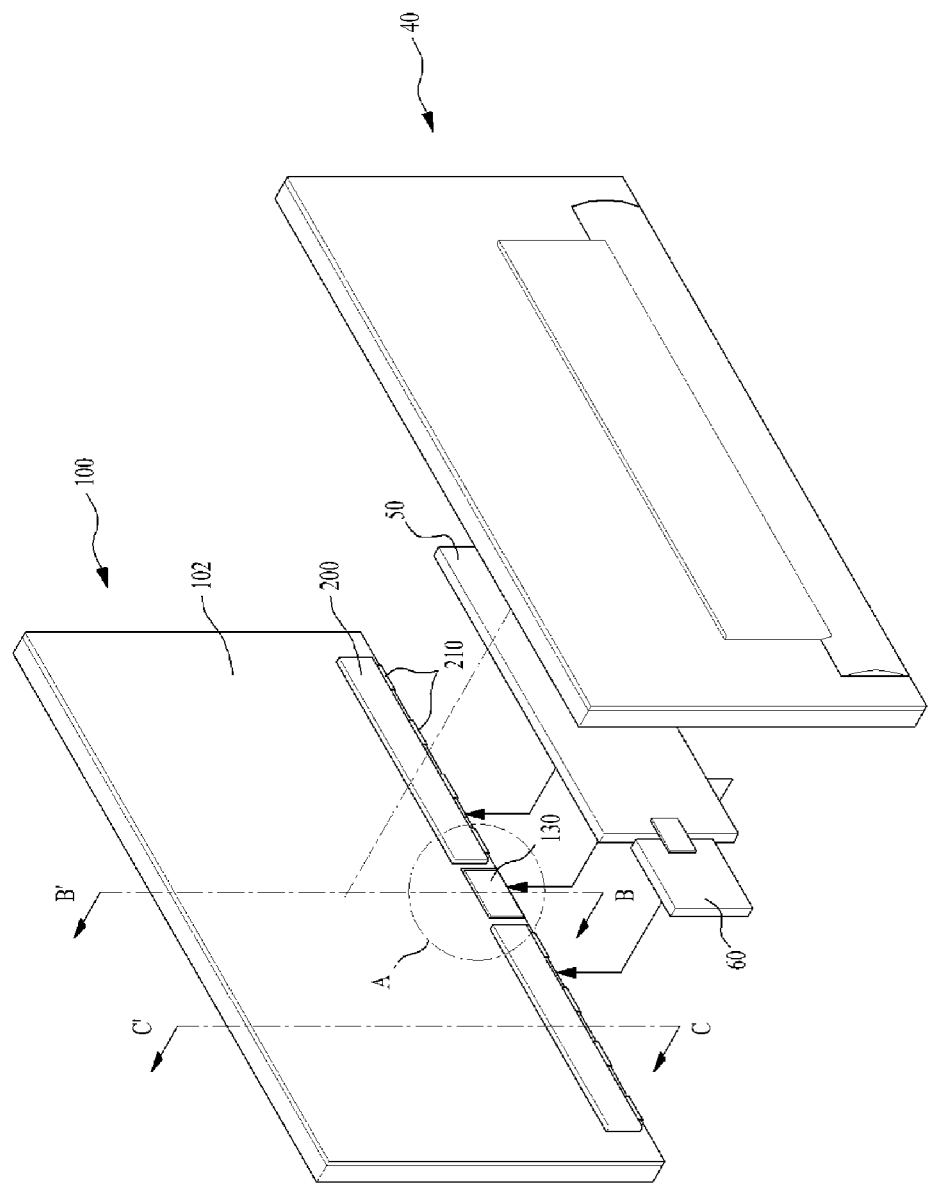
FIG. 2 is an exploded perspective view illustrating a separated state of a power supply unit, a main control module, and a rear cover included in the display device according to the embodiment of FIG. 1.
Figure 3:
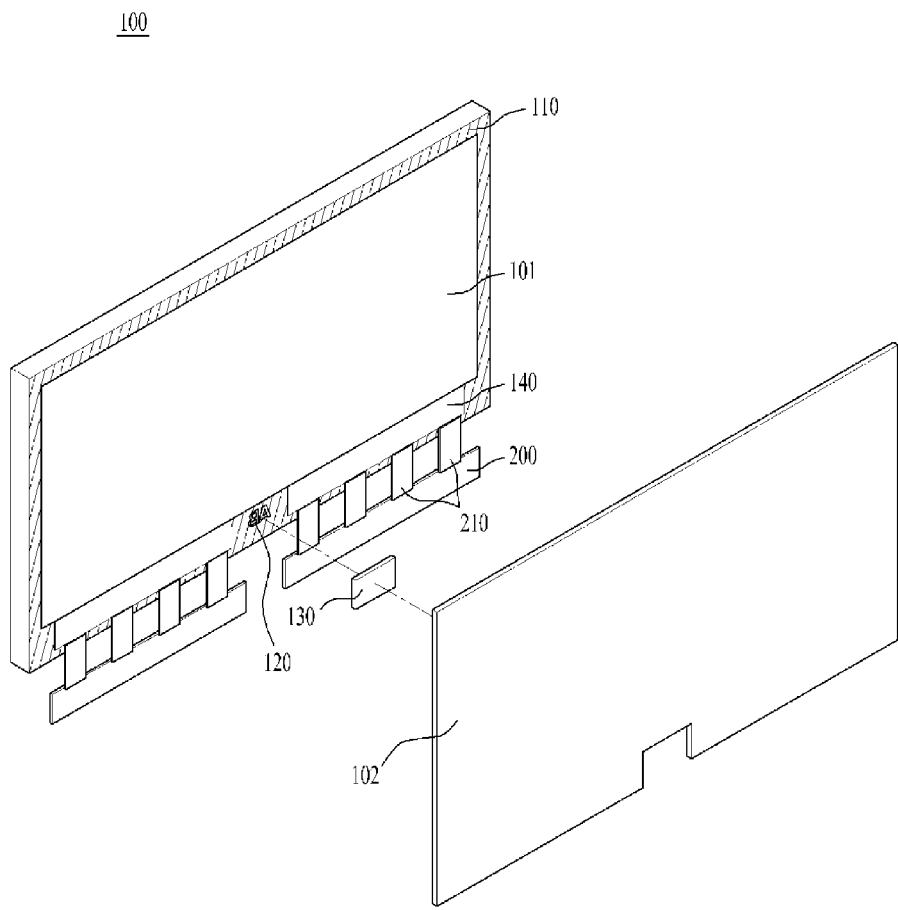
FIG. 3 is an exploded perspective view illustrating a separated state of a logo module and a rear board of a display panel according to the embodiment of FIG. 2.

FIG. 1 is a front perspective view illustrating a display device 1 according to an embodiment of the present invention. FIG. 2 is a rear exploded perspective view illustrating a separated state of a display panel 100 and a rear cover 40 included in the display device according to the embodiment of FIG. 1. Also, FIG. 3 is a rear exploded perspective view illustrating a separated state of a transparent board 101, a logo module 130, and a rear board 102 constituting the display panel 100 according to the embodiment of FIG. 2.

As illustrated in FIG. 1, the display device of the present embodiment may realize a borderless display device. In the borderless display device, a front bezel frame that has conventionally been provided at a front rim of the display panel 100 is omitted, and a bezel portion that is a non-display area 20 of a screen may be directly realized from the display panel 100. As a result, when viewing the display device from the front side, only a small-thickness frame surrounding the periphery of the display panel 100 is seen, which may allow the display device to be seen as being constructed only by the display panel 100.

In this case, as illustrated in FIG. 1, a logo 30 of a manufacturer is provided in the non-display area 20 of the display panel 100. Aesthetic functional effects of the logo may be improved with illumination of the logo 30. To this end, a logo module 130 may be provided to display the logo. The logo module 130 is integrally formed with the display panel 100.

The display device of the present invention as described above includes the display panel 100 with the integrated logo module 130 as illustrated in FIG. 2, a driver circuit unit 140, and a controller.

Referring to FIG. 2, the display device may further include the rear cover 40 configured to cover a rear surface of the display panel 100. Additionally, if necessary, a transparent protective glass (not shown) to protect the display panel 100 may be provided at a front surface of the display panel 100.

The display device may further include a main control module 50 and a power supply unit 60. The main control module 50 may control general operations of the display device, and may include a printed circuit board. As occasion demands, the main control module 50 may include a Timing Controller (ICON) board, or may include a System On Chip (SOC). Additionally, the main control module 50 may include an infrared (IR) receiver to receive a control signal from an external controller. The external controller may be a remote controller or other mobile terminals, and may perform infrared communication with the main control module 50.

The power supply unit 60 serves to apply power, supplied from an external source, to the main control module 50 under the control of a user.

As illustrated in FIG. 2, more specifically, the main control module 50 may be connected to a printed circuit board 200 that is in turn electrically connected to the driver circuit unit 140, and may also be connected to the logo module 130, thereby controlling the printed circuit board 200 and the logo module 130. To this end, at least some of a variety of electronic elements constituting the controller of the display device according to the present invention may be mounted on the main control module 50.

In one example, the printed circuit board 200 may transmit a driving signal to the driver circuit unit 140 under the control of the main control module 50, and consequently may control output of an image from the display panel 100. The main control module 50 and the printed circuit board 200 may be electrically connected to each other via a flexible board, such as a Flexible Printed Circuit Board (FPCB).

The main control module 50 may transmit power, applied from the power supply unit 60, to the driver circuit unit 140 and the logo module 130. The main control module 50 may actuate the display panel 100 and the logo module 130 respectively by transmitting power to the driver circuit unit 140 and the logo module 130.

The front surface of the display panel 100, as illustrated in FIG. 1, consists of an image display area 10 in which an image is formed, and the non-display area 20 provided around the image display area 10. The display panel 100 may include at least one selected from among a Liquid Crystal Display (LCD) panel, a Thin Film Transistor Liquid Crystal Display (TFT LCD) panel, an Organic Light Emitting Diode (OLED) panel, a flexible display panel, and a 3-Dimensional (3D) display panel.

The driver circuit unit 140 feeds a driving signal to the display panel 100, to form an image in the image display area 10. The driver circuit unit 140 may consist of various electronic elements and lead wires to feed electric signals generated from the electronic elements to the display panel 100. At least some of the constituent elements of the driver circuit unit 140 may be arranged in the non-display area 20 of the display panel 100. The controller controls both the display panel 100 and the driver circuit unit 140.

According to an embodiment, the driver circuit unit 140 may include driver Integrated Chips (IC) and conductive lines. The driver ICs generate electric driving signals to form an image under the control of the controller, and the conductive lines extend from the driver ICs for transmission of the electric signals.

The driver ICs may take the form of transistors, and may include a plurality of data source driver ICs and a plurality of scan driver ICs. Arranging the driver ICs constituting the driver circuit unit 140 on a board may mean that the conductive lines, i.e. circuit elements required to drive each driver IC, to be directly patterned on the corresponding board via a semiconductor manufacturing process.

The conductive lines may be formed of a metal and may be directly patterned on the corresponding board. The conductive lines may electrically connect the driver ICs and image forming devices (e.g., organic light emitting diodes, and liquid crystal devices) to each other. The conductive lines may transmit electric signals to the image forming devices, thereby feeding data signals and scan signals to the devices, so as to drive the devices.

As illustrated in FIG. 2, more specifically, the display panel 100 consists of the transparent board 101, the rear board 102, and the logo module 130.

The transparent board 101 defines the front surface of the display panel 100. According to an embodiment, the transparent board 101 may be formed of glass. Alternatively, the transparent board 101 may be a plastic board formed of transparent synthetic resin. Alternatively, the transparent board 101 may be formed of a film material. The material and shape of the transparent board 101 are not limited thereto, and other light transmittable plate-shaped members may be used to form the transparent board 101.

An electrode, to which voltage is applied to form an image on the display panel 100, may be formed at an inner surface of the transparent board 101. When the electrode is formed at the transparent board 101, the electrode may be a transparent electrode. As occasion demands, the transparent board 101 may be provided with a Thin Film Transistor (TFT) array.

Referring to FIG. 3, the transparent board 101 may include a light shielding portion 110 and a light transmitting portion 120. The light shielding portion 110 may be provided on a front surface or a rear surface of the transparent board 101 along the edge of the transparent board 101.

The light shielding portion 110 may be formed of an opaque material to shield light. The light shielding portion 110 configured to shield light defines the non-display area 20 in which an image is not formed even during driving of the display panel 100. The light shielding portion 110 may be obtained by printing a panel line on the rim of one surface of the transparent board 101, or may be obtained by attaching an opaque black tape to the rim of one surface of the transparent board 101. In FIG. 3, an embodiment in which the light shielding portion 110 is formed at a rear surface of the transparent board 101 is illustrated.

The light transmitting portion 120 is formed by removing a part of the light shielding portion 110. That is, a part of the rim of the transparent board 101 may be not provided with the light shielding portion 110 such that only the transparent board 101 or any other light transmitting member remains. For example, if the light shielding portion 110 is formed by printing a panel line on one surface of the transparent board 101, a part of the light shielding portion 110 may not be subjected to printing, and the resulting non-printed portion may define the light transmitting portion 120. The light transmitting portion 120 transmits light, which allows the logo, displayed by the logo module 130, to be visible from the outside of the display panel 100.

According to an embodiment, the light transmitting portion 120 may have a particular pattern. In this case, the particular pattern may form a logo of a manufacturer. According to the present embodiment, even if the logo module 130 simply functions to emit light, the logo may be displayed as the light emitted from the logo module 130 passes through the light transmitting portion 120 having a particular pattern. That is, the pattern of the logo may be determined by the pattern of the light transmitting portion 120. In FIG. 2, an embodiment is illustrated in which the light transmitting portion 120 having a particular pattern is located at a lower end of the light shielding portion 110 that is formed along the rim of the transparent board 101.

According to another embodiment, the logo module 130 may be configured to irradiate light having a particular pattern. In one example, a light source included in the logo module 130 may be fabricated to have a particular shape, or LED devices constituting the light source may be arranged to yield a particular shape. In particular, if the light source is formed of OLED layers, the OLED layers may have a particular pattern.

In the present embodiment, the light transmitting portion 120 needs not have a particular pattern. For example, the light transmitting portion 120 may be obtained by simply removing a rectangular part of the light shielding portion 110. In this case, the shape of the logo may be defined by the light source of the logo module 130, and the light transmitting portion 120 simply functions to transmit light emitted from the light source of the logo module 130 having a particular shape to the outside of the display panel 100.

According to another embodiment, a light transmitting ink having a particular color may be applied to the light transmitting portion 120. For example, the light transmitting ink may be semi-transparent white or red ink. Since the light transmitting ink is applied to the light transmitting portion 120, the logo may emit a particular color of light or various colors of light even when the logo module 130 is configured only to emit white light, which enables representation of various designs of logos.

The rear board 102 is placed on the rear surface of the transparent board 101 such that the rear board 102 and the transparent board 101 face each other. Similarly, the rear board 102 may be provided with an electrode to form an image on the display panel 100, or may be provided with a TFT array, as occasion demands. If the display panel 100 is an LCD panel 100, the rear board 102 and the electrode formed at the rear board 102 may be formed of a light transmitting material, and a backlight unit may further be provided on a rear surface of the rear board 102.

As illustrated in FIG. 2, the logo module 130 is placed on the rear surface of the transparent board 101 so as to overlap the light transmitting portion 120. The logo module 130 is configured to display the logo when voltage is applied thereto, and the logo displayed by the logo module 130 is outwardly displayed through the light transmitting portion 120 of the transparent board 101. The logo module 130 is located at the rear side of the light transmitting portion 120. The logo module 130 may be coupled to the rear surface of the transparent board 101 so as to overlap the light transmitting portion 120. The coupling may be accomplished via bonding.

The logo module 130 may be located at the rear side of the transparent board 101 so as to be placed in the same plane as the rear board 102. Alternatively, the logo module 130 may be interposed between the transparent board 101 and the rear board 102. In the former case, the logo module 130 may be located at a position around the rear board 102, or may overlap the rear board 102. If the logo module 130 and the rear board 102 overlap each other in the same plane, the rear board 102 may have a hole or recess into which the logo module 130 is inserted.

Figure 4:
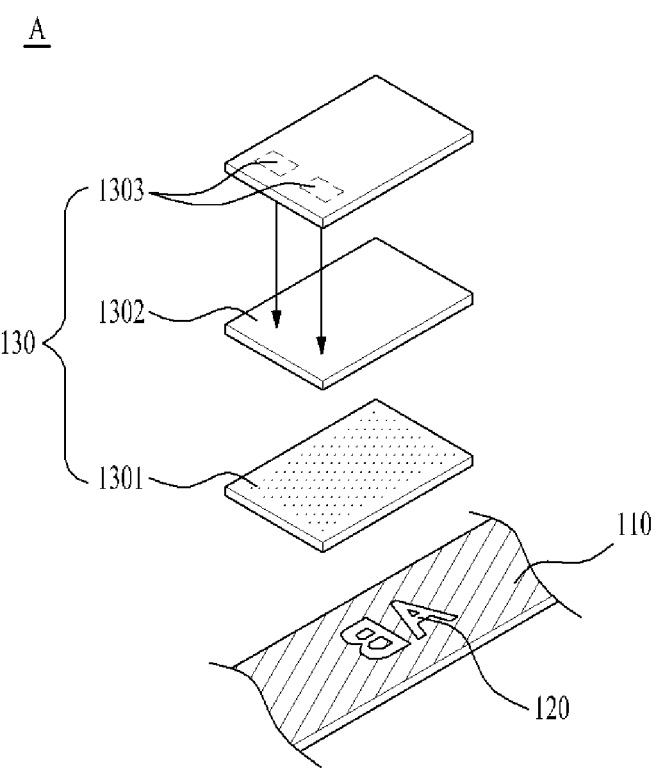
FIG. 4 is an exploded perspective view of the logo module included in the display device according to the embodiment of the present invention.

FIG. 4 is an exploded perspective view illustrating an embodiment of the logo module 130. FIG. 4 is an enlarged view of the portion A of FIG. 2, illustrating the shapes of the light shielding portion 110, the light transmitting portion 120, and the logo module 130 according to the embodiment. As illustrated in FIG. 4, the logo module 130 according to the embodiment may consist of a diffusion sheet 1301, a reflective sheet 1302, and a light source 1303.

The light source 1303 is operated to emit light. The light source 1303 may be formed of LED devices or OLED layers. The light source 1303, as illustrated in FIG. 4, may be mounted on a small auxiliary printed circuit board placed at the rear side of the reflective sheet 1302. The light source 1303 may be controlled by the auxiliary printed circuit board so as to introduce light into the reflective sheet 1302.

The reflective sheet 1302 is placed at the rear side of the diffusion sheet 1301 and is formed of a semi-transparent material. If light emitted from the light source 1303 is introduced into the reflective sheet 1302, at least a part of the light emitted from the light source 1303 may pass through the semi-transparent reflective sheet 1302. The reflective sheet 1302 is placed at the rear side of the diffusion sheet 1301. When the light passes through the reflective sheet 1302, the light may be reflected by the reflective sheet 1302 to thereby be introduced into the diffusion sheet 1301. The reflective sheet 1302 may have various degrees of transparency, and may be formed by depositing a reflective material having a preset transparency on a transparent sheet.

The diffusion sheet 1301 may be placed at the rear side of the transmitting portion 120 formed at the transparent board 101, and may be formed of a transparent material. The diffusion sheet 1301 may uniformly diffuse light reflected from the reflective sheet 1302 to the entire region of the diffusion sheet 1301. As illustrated in FIG. 4, the diffusion sheet 1301 may be provided with convex and concave portions to effectively diffuse light. The size of the diffusion sheet 1301 may be greater than an outer boundary of the light transmitting portion 120.

As the above described logo module 130 is placed on the rear surface of the light transmitting portion 120, the logo displayed by the logo module 130 may be outwardly displayed on the display panel 100 through the light transmitting portion 120. Since the light shielding portion 110 is provided around the light transmitting portion 120, it may appear that light is directed only through the particular pattern of the light transmitting portion 120 when the logo module 130 is operated to display the logo, which may realize a light emitting logo. Alternatively, the logo module 130 may have a self-illuminating function to yield a particular pattern of light emitting logo.

Referring again to FIGS. 2 and 3, at least a part of the driver circuit unit 140 included in the display device is formed in the non-display area 20 of the display panel 100. More specifically, a region of the transparent board 101 or of the rear board 102 where the conductive lines (data lines and scan lines) of the driver circuit unit 140 are located may overlap the light shielding portion 110 formed at the transparent board 101. In FIG. 3, an embodiment is illustrated, in which the driver circuit unit 140 overlaps the light shielding portion 110 on the rear surface of the transparent board 101. Alternatively, the driver circuit unit 140 may overlap the light shielding portion 110 on the front surface of the rear board 102.

As illustrated in FIG. 3, at least a part of the driver circuit unit 140 may be located on the light shielding portion 110 formed at the rim of the transparent board 101. Here, both the driver circuit unit 140 and the light transmitting portion 120 may be formed at the same end of the light shielding portion 110. That is, the light shielding portion 110 and the driver circuit unit 140 may be arranged in a line along one end of the transparent board 101. In this case, the driver circuit unit 140 may be provided at one side or either side of the light transmitting portion 120. When both the light transmitting portion 120 and the driver circuit unit 140 are located on the lower end of the transparent board 101 as illustrated in FIG. 3, it is possible to minimize the non-display area 20 of the display panel 100.

To drive the display panel 100, it is important that any one of the transparent board 101 or the rear board 102 be provided with the driver circuit unit 140. Also, to realize vivid image display, it is desirable to position the driver circuit unit 140 in the non-display area 20 of the display panel 100. That is, it is desirable to provide the non-display area 20 on at least one end of the display panel 100, in order to hide the driver circuit unit 140. As a result of locating the light transmitting portion 120 and the logo module 130 in the non-display area 20 that is formed to hide the driver circuit unit 140, it is possible to omit an additional bezel portion or a conventional front bezel frame that is required to mount the logo. As such, the display panel 100 may have the integrated logo, which may minimize the bezel portion of the display panel 100.

Figure 5:
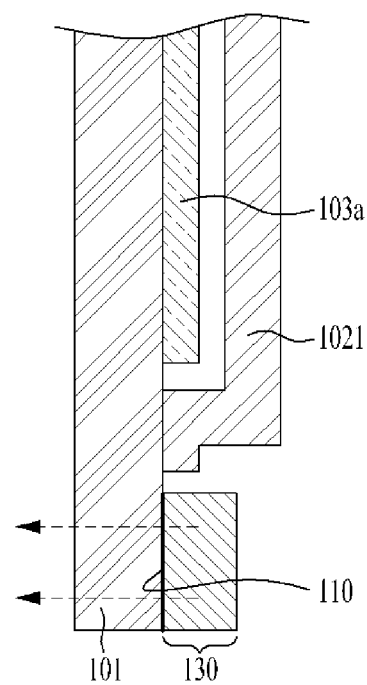
FIG. 5 is a sectional view taken along the line B-B' of FIG. 2, illustrating the display panel according to one embodiment.
Figure 6:
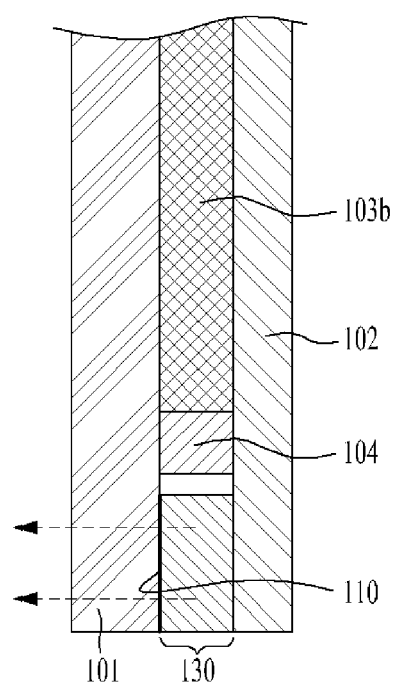
FIG. 6 is a sectional view taken along the line B-B' of FIG. 2, illustrating the display panel according to another embodiment.

FIG. 5 is a sectional view taken along the line B-B' of FIG. 2, illustrating the display panel 100 according to one embodiment, and FIG. 6 is a sectional view taken along the line B-B' of FIG. 2, illustrating the display panel 100 according to another embodiment.

According to one embodiment, the display panel 100 included in the display device of the present invention may be an OLED panel. In this case, as illustrated in FIG. 5, the display panel 100 may further include an OLED layer 103a included in the image display area (10, see FIG. 1) between the transparent board 101 and a rear board 1021. The OLED layer 103a may form an image via light emission when power is applied thereto.

The rear board 1021 of the display panel 100 may be an encapsulation board bonded to the transparent board 101 so as to seal the OLED layer 103a to the transparent board 101. The encapsulation board 1021 may be formed of a metal. The encapsulation board 1021 may cover the OLED layer 103a to prevent oxidation or deterioration of the OLED layer 103a due to moisture and air.

At least a part of a bonding region of the encapsulation board 1021 with respect to the transparent board 101 may overlap the light shielding portion 110 of the transparent board 101. In this case, to provide a space for installation of the logo module 130 at the rear side of the transparent board 101, a recess (see FIG. 3) may be inwardly indented in one end of the encapsulation board 1021 at a position corresponding to the light transmitting portion 120 of the transparent board 101. That is, the recess may be formed by removing a partial region of one end of the encapsulation board 1021 facing the light transmitting portion 120.

When the recess is formed in the encapsulation board 1021 as described above, the logo module 130 may be accommodated in the recess, and thereafter the encapsulation board 1021 may be bonded to the transparent board 101 so as to surround the logo module 130 accommodated in the recess.

More specifically, as illustrated in FIG. 5, the logo module 130 may be coupled to the rear surface of the transparent board 101 so as to overlap the light transmitting portion 120 within the non-display area 20 defined by the light shielding portion 110. The logo displayed by the logo module 130 is outwardly displayed through the light transmitting portion 120 of the transparent board 101. The recess of the encapsulation board 1021 may be bonded to the transparent board 101 at a position inside the logo module 130, and the OLED layer 103a may be interposed between the encapsulation board 1021 and the transparent board 101.

In the case of the OLED panel as described above, the logo module 130 is coupled to the rear surface of the transparent board 101 and is located at a position around the encapsulation board 1021 that encapsulates the OLED layer 103a. Accordingly, despite the fact that the display panel 100 contains the integrated logo module 130, it is possible to ensure normal operation of the OLED layer 103a as well as independent operation of the OLED layer 103a and the logo module 130.

According to another embodiment, the display panel 100 included in the display device of the present invention may be an LCD panel. In this case, as illustrated in FIG. 6, the display panel 100 may further include a sealing portion 104 to seal a space between the transparent board 101 and the rear board 102, and a liquid crystal layer 130b placed inside the sealing portion 104 between the transparent board 101 and the rear board 102. In addition to the liquid crystal layer 103b, the LCD panel 100 may further include a polarizer, a color filter, and a backlight unit.

The liquid crystal layer 130b may be turned on or off on a per pixel basis by a TFT array provided at the transparent board 101 or the rear board 102, and light emitted from the backlight unit may pass through the turned-on pixels so as to form an image. The sealing portion 104 may seal the liquid crystal layer 130b between the transparent board 101 and the rear board 102 such that the liquid crystal layer 103b is accommodated between the transparent board 101 and the rear board 102, thereby protecting the liquid crystal layer 103b from external shock.

In this case, as illustrated in FIG. 6, the light transmitting portion 120 and the logo module 130 of the transparent board 101 are located at the outside of the sealing portion 104. According to an embodiment, the sealing portion 104 may be configured to surround one end of the logo module 130 toward the liquid crystal layer 103b and another end of the logo module 130 extending perpendicular to the previously described end. As illustrated in FIG. 6, the logo module 130 may be coupled to the rear surface of the transparent board 101 so as to overlap the light transmitting portion 120 within the non-display area 20 defined by the light shielding portion 110. The logo displayed by the logo module 130 is outwardly displayed through the light transmitting portion 120 of the transparent board 101. The sealing portion 104 may be located inside the logo module 130, and in turn the liquid crystal layer 130b may be located inside the sealing portion 104.

In the LCD panel 100 of the present embodiment, the logo module 130 is coupled to the rear surface of the transparent board 101 and is located at a position around the sealing portion 104 that seals the liquid crystal layer 103b. As a result, despite the fact that the display panel 100 contains the integrated logo module 130, it is possible to ensure normal operation of the liquid crystal layer 103b as well as independent operation of the liquid crystal layer 130b and the logo module 130.

As described above, the display panel 100 with the integrated logo of the present invention may be an LCD panel 100 or an OLED panel. Additionally, the display panel 100 with the integrated logo of the present invention may include various other display panels, such as a TFT LCD panel, a flexible display panel, a plasma display panel, and the like. In the following description with reference to FIGS. 7 to 9, for convenience, the display panel 100 with the integrated logo of the present invention is illustrated as the OLED panel illustrated in FIG. 5.

Figure 7:
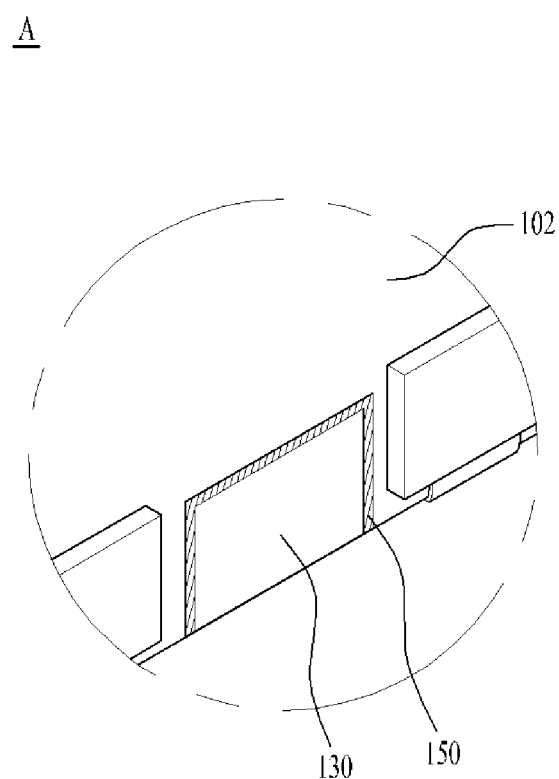
FIG. 7 is a partial exploded perspective view illustrating a display device including a light-leakage prevention structure according to another embodiment of the present invention.

FIG. 7 is an enlarged view of the portion A of FIG. 2, illustrating an embodiment in which the display panel 100 of the present invention further includes a light-leakage prevention structure 150.

According to an embodiment, the display panel 100 may further include a light-leakage prevention structure 150. As illustrated in FIG. 7, the light-leakage prevention structure 150 may be configured to surround at least a part of the periphery of the logo module 130, and serve to block light emitted from the logo module 130 to display the logo. To this end, the light-leakage prevention structure 150 may be formed of an opaque material. For example, the light-leakage prevention structure 150 may be formed of opaque silicon.

In one example, as illustrated in FIG. 7, the logo module 130 may be inserted into the recess formed in the rear board 102. The light-leakage prevention structure 150 may be provided between the logo module 130 and the recess of the rear board 102. If the light-leakage prevention structure 150 is formed of opaque silicon, the light-leakage prevention structure 150 may be applied to a gap that may be generated between the logo module 130 and the recess of the rear board 102.

The light-leakage prevention structure 150 may directly block light emitted from the logo module 130 when displaying the logo, thereby preventing the light from being diffused within the display panel 100. In one example, the light-leakage prevention structure 150 may prevent light emitted from the logo module 130 from accessing the OLED layer 103a or the liquid crystal layer 103b. In another example, if a backlight unit is provided, it is possible to prevent light emitted from the logo module 130 from interfering with light emitted from the backlight unit. As a result, it is possible to prevent the logo module 130 from deteriorating the image display function of the display panel 100.

According to an embodiment, the display device of the present invention may further include the printed circuit board 200, and a flexible board 210 that connects the printed circuit board 200 and the driver circuit unit 140 to each other. The printed circuit board 200 may include the controller. Specifically, the flexible board 210 may be a Tape Carrier Package (TCP) or an FPCB. One example of the printed circuit board 200 and the flexible board 210 may be appreciated with reference to FIGS. 2 and 3.

A variety of electronic elements to construct the controller may be mounted on the printed circuit board 200, and the printed circuit board 200 may function as a Timing Controller (TCON) board for formation of an image of the display device, as occasion demands. The flexible board 210 has one end connected to the printed circuit board 200 and the other end connected to the driver circuit unit 140, thereby electrically connecting the printed circuit board 200 and the driver circuit unit 140 to each other. The flexible board 210 may transmit a control signal, generated from the printed circuit board 200, to the driver circuit unit 140.

Alternatively, the controller may be included in the main control module (50, see FIG. 2), rather than the printed circuit board 200. In this case, a variety of electronic elements to construct the controller may be provided at the main control module 50. The main control module 50 may function as a TCON board. The main control module 50 may be electrically connected to the printed circuit board 200 to transmit a control signal to the printed circuit board 200. Also, the main control module 50 may be electrically connected to the logo module 130 and may transmit a control signal even to the logo module 130.

Referring to FIGS. 2 and 3, in a state in which the flexible board 210 physically connects the driver circuit unit 140 and the printed circuit board 200 to each other, the printed circuit board 200 may be placed on a rear surface of the rear board 102. The flexible board 210 may be formed of a flexible material that can freely bend. Through bending of the flexible board 210, the printed circuit board 200 may be placed on the rear surface of the rear board 102.

When the printed circuit board 200 is placed on the rear surface of the rear board 102, the printed circuit board 200 overlaps the display panel 100. This may minimize the bezel portion of the display panel 100.

Figure 8A:
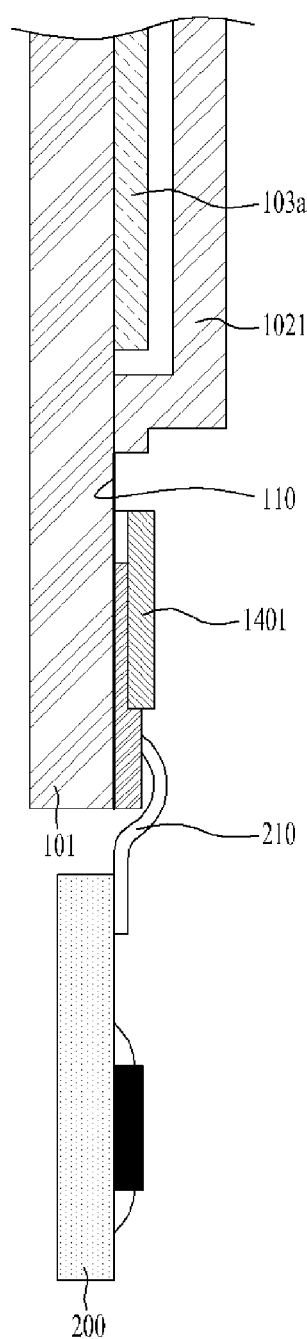
FIG. 8A is a sectional view taken along the line C-C' of FIG. 2, illustrating a display panel and a driver circuit unit according to one embodiment.
Figure 8B:
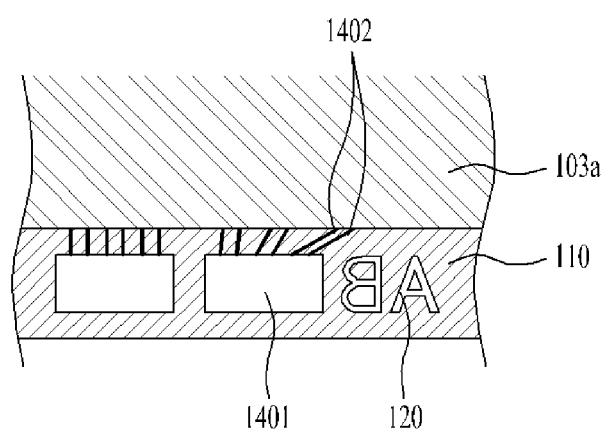
FIG. 8B is a partial rear view illustrating a transparent board of the display panel according to the embodiment of FIG. 8A.
Figure 9:
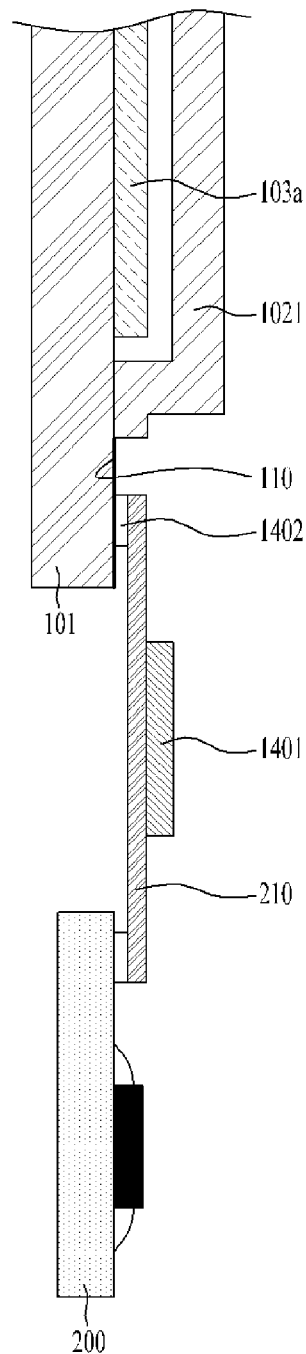
FIG. 9 is a sectional view taken along the line C-C' of FIG. 2, illustrating a display panel and a driver circuit unit according to another embodiment.

FIG. 8A is a sectional view taken along the line C-C' of FIG. 2, illustrating the display panel 100 and the driver circuit unit 140 installed to the display panel 100 according to one embodiment. FIG. 8B is a plan view illustrating a part of the rear surface of the transparent board 101 according to the embodiment. Also, FIG. 9 is a sectional view taken along the line C-C' of FIG. 2, illustrating the display panel 100 and the driver circuit unit 140 according to another embodiment.

According to one embodiment, the driver circuit unit 140 may include driver ICs 1401 and conductive lines 1402 as described above. In this case, the driver ICs 1401 may be formed on the transparent board 101 or the rear board 102 so as to overlap the light shielding portion 110 of the transparent board 101, and a least some of the conductive lines 1402 may diagonally extend.

In this case, as illustrated in FIG. 8A, the driver ICs 1401 and the printed circuit board 200 may be connected to each other via the flexible board 210. In FIG. 8A, the driver ICs 1401 may be coupled to the rear surface of the transparent board 101 so as to overlap the light shielding portion 110. As described above, the encapsulation board 1021 may be bonded to the transparent board 101 at a position inside the light shielding portion 101, and the OLED layer 103a may be located between the encapsulation board 1021 and the transparent board 101.

In the case in which the conductive lines 1402 are formed on the rear surface of the transparent board 101 as illustrated in FIG. 8B, at least some of the conductive lines 1402 may diagonally extend.

To transmit a driving signal to the entire OLED layer 103a, the conductive lines 1402 are desirably spaced apart from one another throughout the image display area (10, see FIG. 1). In the case in which the light transmitting portion 120 is formed by removing a part of the light shielding portion 110 of the transparent board 101 as described in the embodiment of the present invention, the driver ICs 1401 cannot be formed in a region of the light shielding portion 110 where the light transmitting portion 120 is located, as illustrated in FIG. 8B. Therefore, the driver ICs 1401 may be arranged at both sides of the light shielding portion 110, and the conductive lines 1402 are patterned such that some of the conductive lines 1402 diagonally extend from the driver ICs 1410 as illustrated in FIG. 8B, so as to transmit a driving signal even to the OLED layer 103a provided immediately inside the light transmitting portion 120.

According to another embodiment, as illustrated in FIG. 9, the driver IC 1401 may be mounted on the flexible board 210 that connects the driver circuit unit 140 and the printed circuit board 200 to each other, and the conductive line 1402 may be formed on the transparent board 101 or the rear board 102 so as to overlap the light shielding portion 110 of the transparent board 101.

As illustrated in FIG. 9, one end of the driver IC 1401 may be bonded to the rear surface of the transparent board 101 and the other end of the driver IC 1401 may be mounted on the flexible board 210 that is connected to the printed circuit board 200. In this case, the conductive line 1402 may be provided on the light shielding portion 110 formed at the rear surface of the transparent board 101, and one end of the flexible board 210 may overlap the light shielding portion 110 of the transparent board 101 and may be bonded to the rear surface of the transparent board 101 via a pad electrode. The pad electrode may be used to electrically connect the flexible board 210 and the driver IC 1401 to each other, so as to transmit a driving signal to the conductive line 1402.

Hereinafter, a control method of the logo module 130 included in the display device according to an embodiment of the present invention will be described with reference to FIGS. 10A to 10C.

Figure 10A:
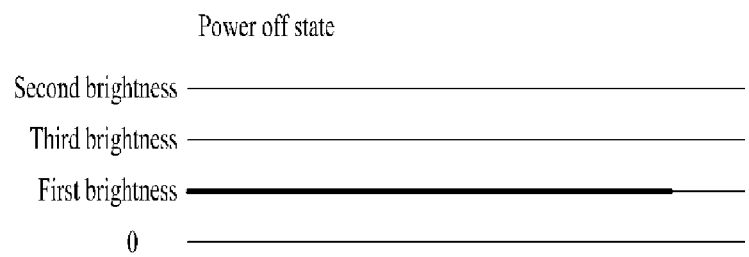
FIGS. 10A to 10C are graphs illustrating brightness of a logo displayed by the logo module, respectively, when the display device is in a power-off state, when the display device is changed to a power-on state, and when the display device is changed to a power-off state.
Figure 10B:
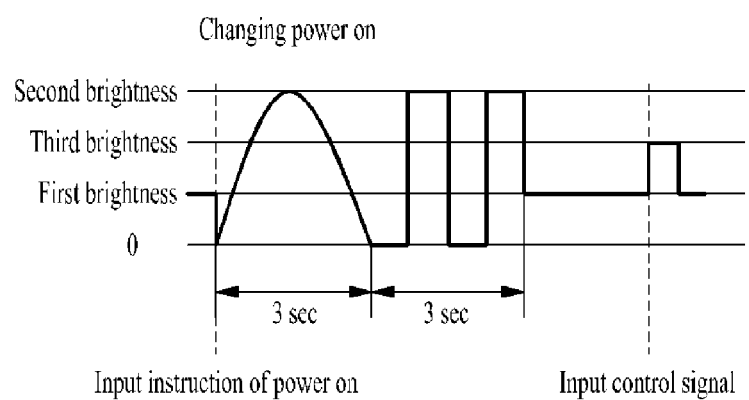
Figure 10C:
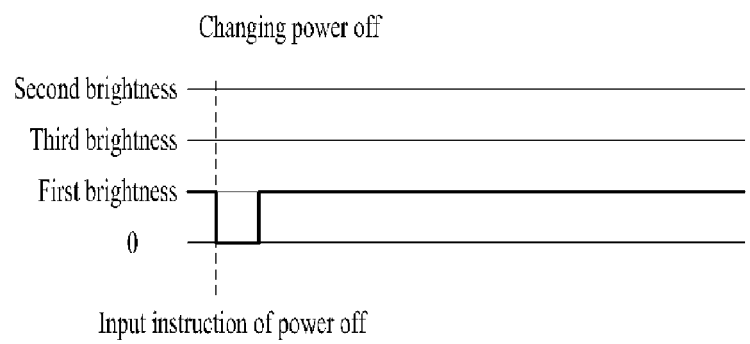

FIGS. 10A to 10C are graphs illustrating brightness of the logo displayed by the logo module, respectively, when the display device is in a power-off state, when the display device is changed to a power-on state, and when the display device is changed to a power-off state.

According to an embodiment, the controller may control the logo module to display a logo having a first brightness and a first color when power is not applied to the display panel.

As illustrated in FIG. 10A, even when the display device does not display an image in a power-off state thereof, the logo module may be controlled to display a logo having a predetermined color and a predetermined brightness. As a result, the display device may display the logo through the light transmitting portion even in a standby state of the display device, which enables continuous display of the logo.

According to another embodiment, upon change to apply power to the display panel in order to display an image, the controller may control the logo module to display the logo such that the logo flickers preset times at a second brightness different from the first brightness. In this case, it is desirable that the second brightness is greater than the first brightness.

As illustrated in FIG. 10B, when an instruction to turn on the display device that has been in a power-off state is input to the controller, the controller may control the logo module such that the brightness of the logo displayed by the logo module is gradually increased to the second brightness. Also, the controller may control the logo module such that the logo flickers preset times for a predetermined time. For example, as illustrated in FIG. 10B, the logo module may be controlled such that the logo to flickers three times for 6 seconds as illustrated in FIG. 10B.

Alternatively, upon change to apply power to the display panel, the controller may control the logo module such that a logo, having a second color different from the first color, flickers preset numbers.

Flickering of the logo is realized by flickering of the logo module, and the user will appreciate from the logo that an instruction to turn on the display device has been input.

According to another embodiment, while the display panel displays an image, i.e. while the display panel is in a power-on state, the controller may control the logo module such that the light source of the logo module is turned off, such that the logo is displayed at a third brightness different from the first brightness, or such that the logo having a third color different from the first color is displayed. In this case, the third brightness may be less than the first brightness and the second brightness as described above. Also, the third color may be darker than the first color and the second color as described above.

The display panel displays an image while power is applied thereto. Upon display of the image, if the logo located at the end of the image display area is brightly displayed, the logo may distract the viewer. To prevent this problem, in the present embodiment, the logo module may not emit light while the display panel displays an image, or the brightness of the logo may be reduced, or a darker color of logo may be displayed in a standby state of the display device.

If the logo is displayed as flickering while power is applied to the display panel as described above, the controller may control the logo module such that the light source of the logo module is turned off after completion of the flickering operation, or such that the logo having the third brightness or the third color is displayed.

According to another embodiment, if a control signal is input from an external controller, the controller may control the logo module such that a logo having a fourth brightness different from the first brightness is displayed. In this case, the fourth brightness may be greater than the first brightness and less than the second brightness.

The control signal may be an instruction signal to change the volume of sound output from the display device or to change a channel output from the display device. The external controller may be a remote controller or a mobile terminal to generate the control signal. The remote controller or the mobile terminal may transmit the control signal to the display device when manipulated by the user. Alternatively, the control signal may be received as the display device is directly manipulated.

Referring to FIG. 10B, if the control signal is input from the remote controller while the display device is turned on to output an image, the controller may control the logo module upon receiving the control signal such that the logo having the fourth brightness is displayed. According to an embodiment, the controller may control the logo module such that the logo is displayed at the fourth brightness for a predetermined time. Thereby, the logo may be more brightly viewed by the user of the display device, and consequently the user may visually recognize input of the control signal via the logo.

Alternatively, the controller may control the logo module upon receiving an external control signal to stop display of the logo. Alternatively, the controller may control the logo module such that the logo having a fourth color different from the first color is displayed upon receiving an external control signal. The fourth color may be different from the second color or the third color. According to another embodiment, the controller may control the logo module to stop display of the logo for a preset time upon change to apply no power to the display panel.

Referring to FIG. 10c, if an instruction to turn off the display device that has been in a power-on state is input, the controller may control the logo module such that the logo modules does not temporarily display the logo. After stopping the logo module for a predetermined time, the controller may control the logo module such that the logo module displays the logo having the first brightness when the display device returns to a standby state. While driving of the logo module stops, the logo module does not irradiate light to the logo, and the user may visually check the logo that an instruction to turn off the display device has been received.

As is apparent from the above description, according to at least one embodiment of the present invention, it is possible to completely omit a bezel frame, which has conventionally been provided at a front surface of a display device, even while displaying a logo on the front surface of the display device, which may minimize a bezel portion throughout the edge of the display device. Thus, it is possible to effectively display a manufacturer of the display device and to provide the same size display device with a greater display area, which may advantageously enhance the degree of freedom in terms of design.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display device comprising:
    a display panel including an image display area for formation of an image and a non-display area formed around the image display area, the display panel including:
        a transparent board including a light shielding portion formed along an edge thereof to define the non-display area by blocking light and a light transmitting portion formed at a part of the light shielding portion, wherein colored light-transmitting ink is applied to the light transmitting portion;
        a rear board placed to face the transparent board; and
        a logo module placed at a rear surface of the transparent board so as to overlap the light transmitting portion, the logo module outwardly displaying a logo through the light transmitting portion,
        wherein the logo module includes:
            a light-transmitting diffusion sheet at a rear side of the light transmitting portion and the light shielding portion;
            a semi-transparent reflective sheet at a rear side of the diffusion sheet; and
            a light source at a rear side of the semi-transparent reflective sheet to introduce light into the semi-transparent reflective sheet,
        wherein the semi-transparent reflective sheet is located between the light-transmitting diffusion sheet and the light source such that the light-transmitting diffusion sheet uniformly diffuses light reflected from the semi-transparent reflective sheet to a region of the light-transmitting diffusion sheet,
        wherein the light-transmitting diffusion sheet, the semi-transparent reflective sheet and the light source have substantially the same size, and
        wherein the light-transmitting diffusion sheet contacts the light transmitting portion and the light shielding portion;
    a driver circuit unit configured to feed a driving signal for forming the image at the image display area, at least a part of the driver circuit unit being formed on one of the transparent board and the rear board so as to overlap the light shielding portion; and
    a controller configured to control the display panel and the driver circuit unit,
        wherein the controller is configured to control the logo module for displaying the logo with a first brightness and a first color when power is not applied to the display panel and for flickering the logo a preset number of times with a second brightness or a second color upon change to apply power to the display panel for display of the image, and
        wherein the second brightness is different from the first brightness and the second color is different from the first color.

2. The display device according to claim 1, wherein the display panel further includes an Organic Light Emitting Diode (OLED) layer provided between the transparent board and the rear board in the image display area, the OLED layer serving to emit light,
    wherein the rear board is bonded to the transparent board so as to seal the OLED layer to the transparent board, the rear board being an encapsulation board having an inwardly indented recess part corresponding to the light transmitting portion, and
    wherein the logo module is located in the recess part.

3. The display device according to claim 1, wherein the display panel further includes a sealing portion to seal a space between the transparent board and the rear board,
    wherein a liquid crystal layer is provided between the transparent board and the rear board such that the sealing portion surrounds a perimeter of the liquid crystal layer, and
    wherein the light transmitting portion of the transparent board and the logo module are arranged at an outside of the sealing portion.

4. The display device according to claim 1, wherein the display panel further includes a light-leakage prevention structure configured to surround at least a part of a periphery of the logo module and to block light emitted from the logo module for display of the logo.

5. The display device according to claim 1, wherein the driver circuit unit includes:
    a driver Integrated Chip (IC) located at one of the transparent board and the rear board so as to overlap the light shielding portion, the driver IC configured to generate the driving signal as an electric signal; and
    a conductive line diagonally extending from the driver IC to transmit the electric signal.

6. The display device according to claim 1, further comprising:
    a printed circuit board provided with the controller; and
    a flexible board having one end connected to the printed circuit board and the other end connected to the driver circuit unit so as to electrically connect the printed circuit board to the driver circuit unit.

7. The display device according to claim 6, wherein the flexible board is one of a tape carrier package and a flexible printed circuit board.

8. The display device according to claim 6, wherein the printed circuit board is located at a rear surface of the rear board.

9. The display device according to claim 6, wherein the driver circuit unit includes a driver integrated chip (IC) to generate the driving signal as an electric signal and a conductive line to transmit the electric signal,
    wherein the driver IC is mounted on the flexible board, and
    wherein the conductive line is formed on one of the transparent board and the rear board so as to overlap the light shielding portion.

10. The display device according to claim 1, wherein, while the display panel displays the image, the controller is configured to control the logo module to display the logo while the light source of the logo module is turned off such that either the logo has a third brightness different from the first brightness or the logo has a third color different from the first color.

11. The display device according to claim 1, wherein, when a control signal is input from an external controller, the controller of the display device is configured to control the logo module to display the logo while the light source of the logo module is turned off such that either the logo has a fourth brightness different from the first brightness or the logo has a fourth color different from the first color.

12. The display device according to claim 1, wherein the light transmitting portion is formed by removing the part of the light shielding portion.

13. The display device according to claim 1, wherein the light transmitting portion is formed separately from the image display area.

* * * * *